United States Patent
Neufeld et al.

(10) Patent No.: US 6,922,435 B2
(45) Date of Patent: Jul. 26, 2005

(54) METHOD AND APPARATUS FOR GENERATING PN SEQUENCES AT ARBITRARY PHASES

(75) Inventors: Arthur J. Neufeld, San Diego, CA (US); Ehren J. D. Van Melle, San Diego, CA (US); Eric Handojo, Carlsbad, CA (US)

(73) Assignee: Qualcomm Inc, San Diego, CA (US)

( * ) Notice: Subject to any disclaimer, the term of this patent is extended or adjusted under 35 U.S.C. 154(b) by 649 days.

(21) Appl. No.: 09/919,685

(22) Filed: Jul. 31, 2001

(65) Prior Publication Data

US 2002/0067762 A1 Jun. 6, 2002

Related U.S. Application Data

(60) Provisional application No. 60/236,774, filed on Sep. 29, 2000.

(51) Int. Cl.[7] .................................................. H04B 1/69
(52) U.S. Cl. ....................... 375/149; 140/142; 140/147; 370/331; 370/342
(58) Field of Search ................................. 375/136, 140, 375/142, 147, 148, 149; 370/324, 311, 342, 331, 332, 320, 335; 708/252, 256

(56) References Cited

U.S. PATENT DOCUMENTS 5,790,589 A    8/1998  Hutchison et al. .......... 375/149
6,560,212 B1 * 5/2003  Prasad et al. ............... 370/335
6,594,680 B1 * 7/2003  Gu et al. ..................... 708/256
6,639,907 B2 * 10/2003 Neufeld et al. ............. 370/342
6,724,738 B1 * 4/2004  Storm et al. ................ 370/320
6,735,606 B2 * 5/2004  Terasawa et al. ........... 708/252

FOREIGN PATENT DOCUMENTS

EP    0994573    4/2000
WO    9945670    9/1999

* cited by examiner

*Primary Examiner*—Shuwang Liu
(74) *Attorney, Agent, or Firm*—Philip R Wadsworth; Charles D Brown; George C. Pappas

(57) ABSTRACT

Techniques to generate a pseudo-random number (PN) sequence at a desired phase using "masking" to adjust the phase of the PN sequence in coarse increments (e.g., 64-PN chip increments) to account for a large phase adjustment. Slewing may then be used to adjust the PN phase in fine increments (e.g., ⅛ PN chip increments) to obtain the desired phase. Prior to each scan for the pilot from a particular base station, a PN mask corresponding to a phase closest to the start of a new search window is applied to a PN generator to obtain an initial phase for the PN sequence. From the initial phase obtained by the applied mask, the PN generator is then slewed to the start of the search window. The masking can be used to obtain a large phase adjustment in less time, which is likely to improve search performance.

28 Claims, 7 Drawing Sheets

METHOD AND APPARATUS FOR GENERATING PN SEQUENCES AT ARBITRARY PHASES

CROSS-REFERENCE TO RELATED APPLICATIONS

This application claims the benefit of U.S. Provisional Application Ser. No. 60/236,774, filed Sep. 29, 2000, the content of which is incorporated herein by reference in its entirety.

FIELD

The present invention relates to data communication, and more particularly to techniques for generating pseudo-random number (PN) sequences at various arbitrary phases using "masking" for coarse phase adjustment.

BACKGROUND

Wireless communication systems are widely deployed to provide various types of communication such as voice, data, and so on, for a number of users. These systems may be based on code division multiple access (CDMA), time division multiple access (TDMA), frequency division multiple access (FDMA), or some other multiple access technique. CDMA systems may provide certain advantages over other types of system such as increased capacity. A CDMA system may be designed to implement IS-95, IS-856, cdma2000, W-CDMA, some other CDMA standard, or any combination thereof. These CDMA standards are well known in the art.

In a wireless communication system, a pilot is often transmitted from a transmission source (e.g., a base station) to a receiver device (e.g., a terminal) to assist the receiver device perform a number of functions. The pilot is typically generated based on a known data pattern (e.g., a sequence of all zeros) and using a known signal processing scheme (e.g., covered with a particular channelization code and spread with a known PN sequence). The pilot may be used at the receiver device for synchronization with the timing and frequency of the transmission source, estimation of the quality of the communication link, coherent demodulation of a data transmission, and possibly other functions such as determination of the specific transmission source having the best link to the receiver device and the highest data rate supportable by the transmission source.

In some CDMA systems (e.g., IS-95, IS-856, and cdma2000 systems), each base station is assigned a specific "offset" of a complex PN sequence used for spreading traffic and pilot data prior to transmission. The use of PN sequences of different offsets by different base stations allows the terminals to distinguish individual base stations based on their assigned PN offsets. Because of variable propagation delays and scattering in the communication link, the signals transmitted from the base stations may reach the terminals at different times. Thus, a terminal typically searches through the received signal at various PN phases (or PN chip offsets) to look for strong instances (or multipaths) of the transmitted signals, which may then be further processed to recover data and other information.

In searching for strong multipaths, the terminal typically performs a number of correlations of the received signal (after preconditioning and digitization) with locally generated PN sequences at various phases. Each correlation results in a high value if the phase of the locally generated PN sequence is aligned with that of the particular multipath being searched, and a low value otherwise.

Because a number of multipaths may be received for a number of base stations assigned with a number of different PN offsets, a PN generator within the terminal needs to generate PN sequences at numerous phases in the search for these multipaths. In the search for strong multipaths from a particular base station, it may be necessary in certain instances to jump the phase of the PN sequence from a current phase to a new phase that may be a large distance away. In certain other instances, it may be necessary to adjust the phase in smaller increments (e.g., in fractions of a PN chip, such as ⅛ chips). The ability to quickly move the PN sequence to the desired phase may improve search performance.

There is therefore a need in the art for techniques to quickly and efficiently generate PN sequences at various arbitrary phases. These PN sequences may be advantageously used to search for strong multipaths from a particular base station in a CDMA communication system.

SUMMARY

Aspects of the invention provide techniques to generate a PN sequence at a desired phase using masking to adjust the phase of the PN sequence in coarse increments (e.g., 64-PN chip increments). Slewing may thereafter be used to adjust the PN phase in fine increments (e.g., ⅛ PN chip increments) to the desired phase. Masking can thus be advantageously used to account for a large phase adjustment that would otherwise take more time to accomplish via slewing.

A signal received at a terminal may be scanned multiple times to search for pilots from one or more base stations. Prior to a scan for the pilot from a particular base station, a PN mask corresponding to a phase (e.g., a PN offset) closest to the start of a new search window may be applied to a PN generator to obtain the nominal phase for the PN sequence. This phase may be determined by a combination of (1) the PN offset assigned to the base station, (2) the offset of the search window, which may be determined by a known propagation delay of the multipath being searched, (3) the size of the search window, and so on. From the initial phase obtained by the applied PN mask, the PN generator is then slewed to the start of the search window, if and to the extent necessary. The scan over the search window can thereafter commence. The masking can thus be used to obtain a large adjustment in the PN phase in less time, which is likely to improve search performance.

The invention further provides methods, apparatus (e.g., receiver devices), and other elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
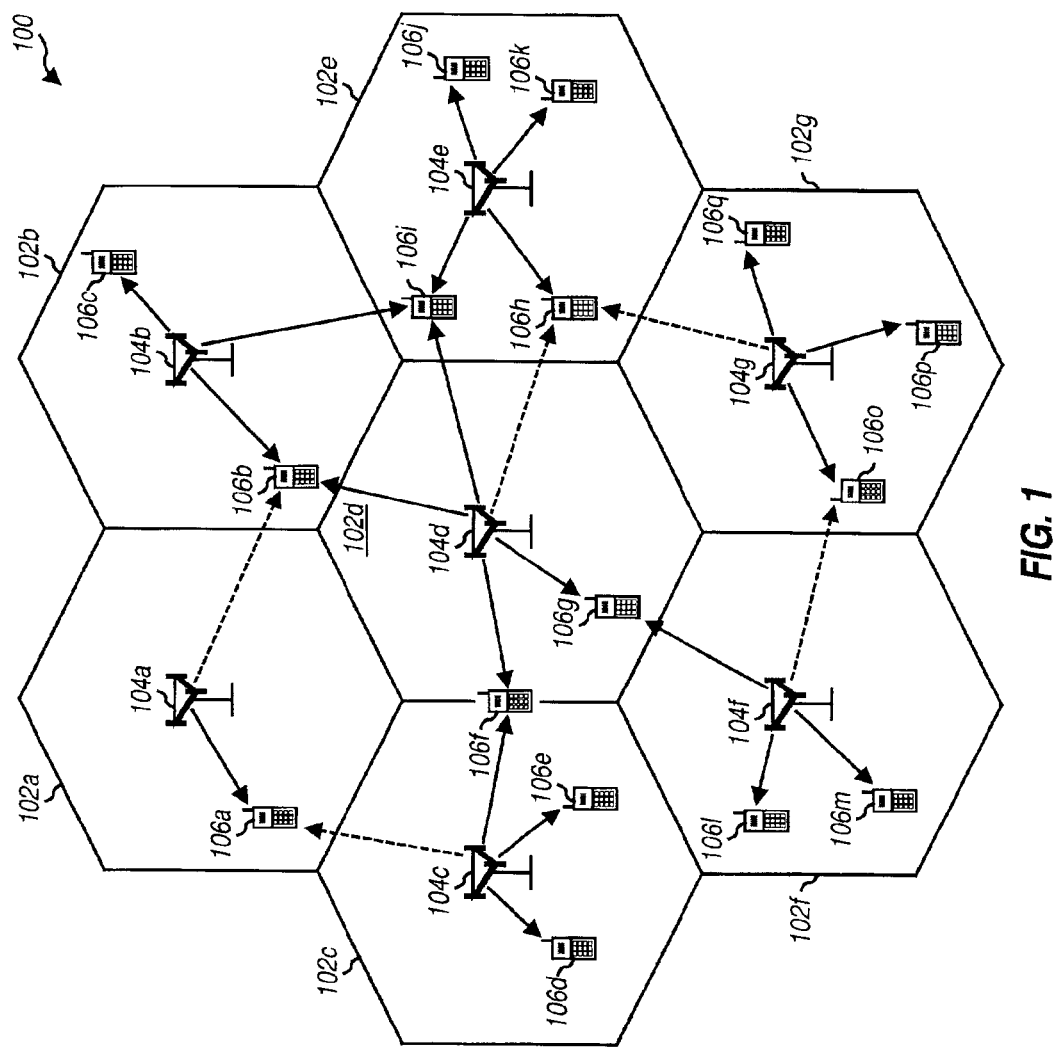
FIG. 1 is a diagram of a wireless communication system that supports a number of users and is capable of implementing various aspects and embodiments of the invention.

FIG. 1 is a diagram of a wireless communication system 100 that supports a number of users and is capable of implementing various aspects and embodiments of the invention. System 100 includes a number of base stations 104 that provide coverage for a number of geographic regions 102. The base station is also referred to as a base transceiver system (BTS) or an access point, and the base station and/or its coverage area are also often referred to as a cell. System 100 may be designed to implement one or more CDMA standards such as IS-95, cdma2000, W-CDMA, IS-856, and some other standard.

As shown in FIG. 1, various terminals 106 are dispersed throughout the system. In an embodiment, each terminal 106 may communicate with one or more base stations 104 on the forward and reverse links at any given moment, depending on whether or not the terminal is active and whether or not it is in soft handoff. The forward link (i.e., downlink) refers to transmission from the base station to the terminal, and the reverse link (i.e., uplink) refers to transmission from the terminal to the base station.

In the example shown in FIG. 1, base station 104a transmits to terminal 106a on the forward link, base station 104b transmits to terminals 106b, 106c, and 106i, base station 104c transmits to terminals 106d, 106e, and 106f, and so on. In FIG. 1, a solid line with an arrow indicates a user-specific data transmission from the base station to the terminal. A broken line with an arrow indicates that the terminal is receiving pilot and other signaling, but no user-specific data transmission, from the base station. The reverse link communication is not shown in FIG. 1 for simplicity.

Figure 2:
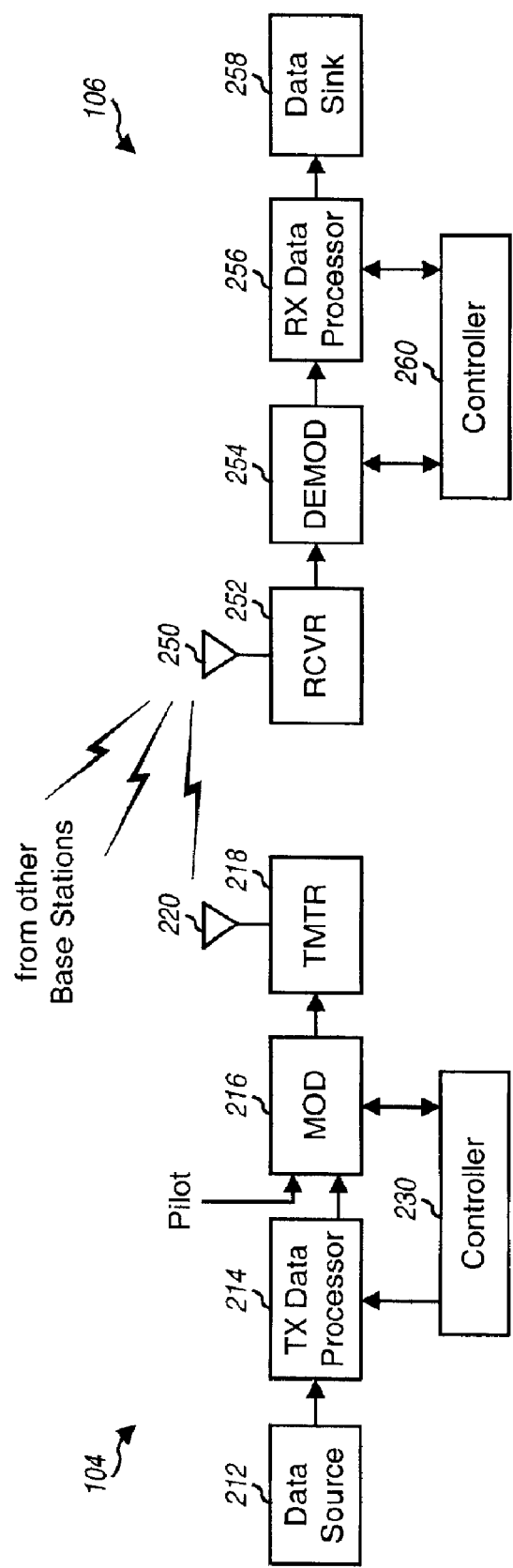
FIG. 2 is a simplified block diagram of an embodiment of a base station and a terminal.

FIG. 2 is a simplified block diagram of an embodiment of base station 104 and terminal 106, which are capable of implementing various aspects and embodiments of the invention. On the forward link, at base station 104, a transmit (TX) data processor 214 receives different types of traffic such as user-specific data from a data source 212, messages from a controller 230, and so on. TX data processor 214 then formats and codes the data and messages based on one or more coding schemes to provide coded data. Each coding scheme may include any combination of cyclic redundancy check (CRC), convolutional, Turbo, block, and other coding, or no coding at all. Typically, different types of traffic are coded using different coding schemes.

A modulator (MOD) 216 then receives pilot data and the coded data from TX data processor 214 and further processes the received data to generate modulated data. For some CDMA systems, the processing by the modulator 216 includes: (1) covering the coded and pilot data with channelization codes (these being Walsh codes for IS-95 and cdma2000 systems) to channelize the user-specific data, messages, and pilot data onto their respective traffic channels and (2) spreading the channelized data with pseudo-random number (PN) sequences having a particular PN offset assigned to the base station. The modulated data is then provided to a transmitter unit (TMTR) 218 and conditioned (e.g., converted to one or more analog signals, amplified, filtered, and quadrature modulated) to generate a forward modulated signal suitable for transmission via an antenna 220 and over a wireless link to the terminals.

At terminal 106, the forward modulated signal is received by an antenna 250 and provided to a receiver unit (RCVR) 252. Receiver unit 252 conditions (e.g., filters, amplifies, downconverts, and digitizes) the received signal and provides data samples. A demodulator (DEMOD) 254 then receives and processes the data samples to provide recovered symbols. For some CDMA systems, the processing by demodulator 254 includes (1) despreading the data samples with the same PN sequence used to spread the data at the base station, (2) decovering the despread samples to channelize the received data and messages onto their respective traffic channels, and (3) coherently demodulating the channelized data with a pilot recovered from the received signal. Demodulator 254 may implement a rake receiver that can process multiple instances of the received signal, as described below.

A receive (RX) data processor 256 then receives and decodes the symbols from demodulator 256 to recover the user-specific data and messages transmitted on the forward link. The processing by demodulator 254 and RX data processor 256 is complementary to that performed by modulator 216 and TX data processor 214 at base station 104, respectively.

To generate a pilot preference (i.e., a pilot) at the base station, the pilot data is initially covered with a particular channelization code for the traffic channel used to transmit the pilot, and further spread with the PN sequence at the PN offset assigned to the base station. To simplify the signal processing at both the base stations and the terminals, CDMA systems typically use a sequence of all zeros for the pilot data and a channelization code of zero for the pilot channel. Thus, the pilot is effectively the PN sequence assigned to the base station.

At the terminal, the pilot from a particular base station may be recovered by processing a received signal in a manner complementary to that performed at the base station. The processing at the terminal typically includes (1) conditioning and digitizing the received signal to provide data samples, (2) despreading the data samples with a PN sequence at a specific PN chip offset (or phase) that matches the PN chip offset of the pilot being recovered, and (3) decovering the despread samples with the same channelization code used to cover the pilot data at the base station. If the pilot data is a sequence of all zero and the channelization code is zero, then the processing to recover the pilot simply includes despreading the data samples with the PN sequence and accumulating the despread samples over an integer multiple of the length of the channelization code (to remove the data transmitted on other traffic channels). This complementary signal processing recovers the (desired) pilot from the base station and removes other (extraneous) transmissions on other traffic channels from this and other base stations.

Figure 3:
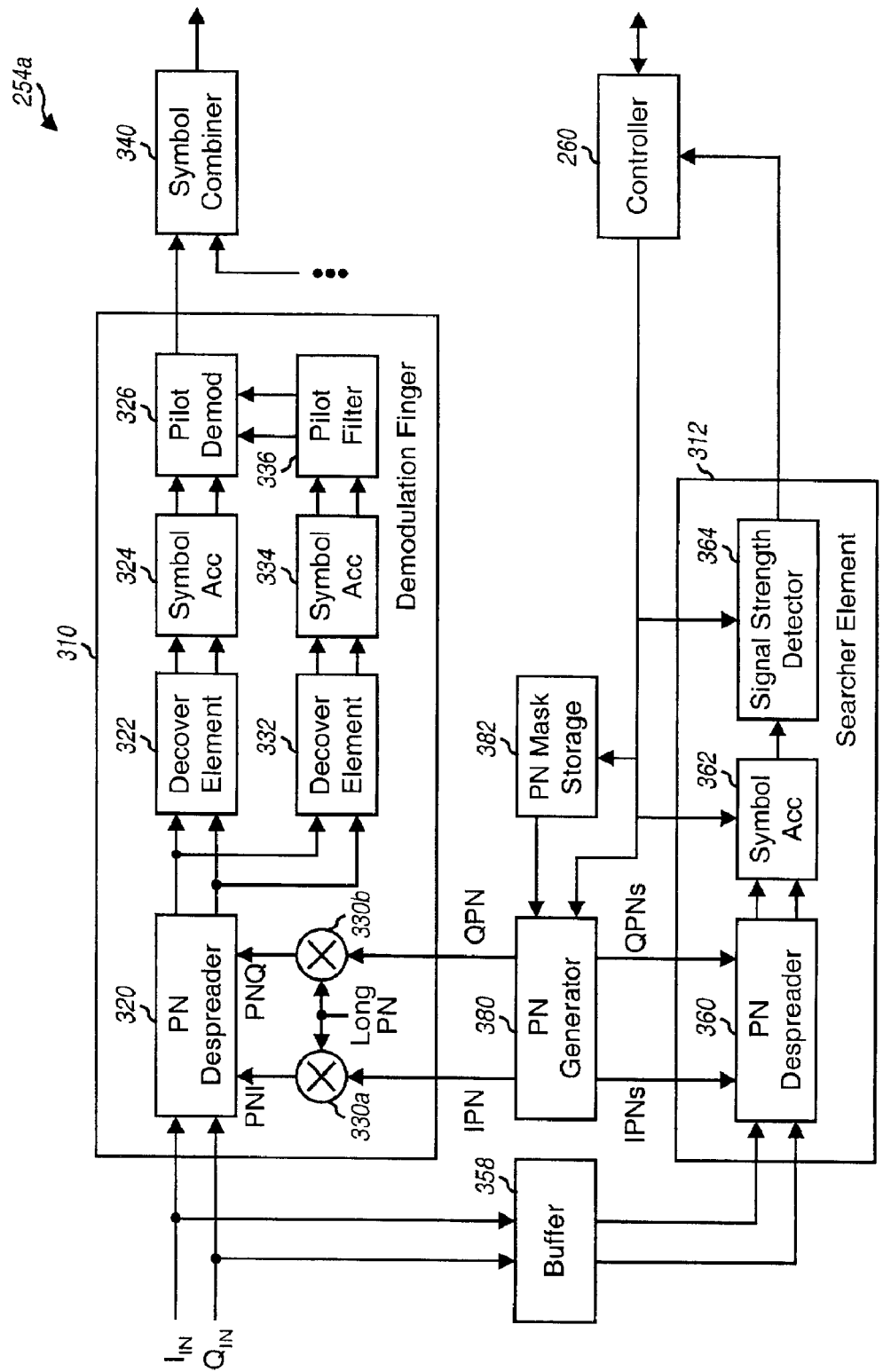
FIG. 3 is a block diagram of a demodulator (e.g., a rake receiver) that may be used to search for strong signal instances (i.e., multipaths) and to demodulate one or more multipaths of sufficient strength.

FIG. 3 is a block diagram of a demodulator 254a that may be used to search for strong signal instances (or multipaths) of a received signal and to demodulate one or more multipaths of sufficient strength. Demodulator 254a is one embodiment of demodulator 254 in FIG. 2 and implements a rake receiver that includes a searcher element 312 (or searcher) and a number of finger processors 310 (or demodulation fingers). Only one finger processor is shown in FIG. 3 for simplicity.

A signal transmitted from a base station may be received by a terminal via multiple signal paths. The received signal at the terminal may thus include a number of multipaths for a number of base stations. Searcher 312 is then used to search for strong multipaths in the received signal and to provide an indication of the strength and timing of each found multipath that meets one or more criteria. Typically, searcher 312 searches for the pilots transmitted from the base stations to find these multipaths.

One finger processor 310 may be assigned (e.g., by controller 260) to process each multipath of interest, e.g., as determined by controller 260 based on the signal strength and timing information provided by searcher 312. For example, each multipath of sufficient strength may be assigned to and processed by a respective finger processor of the rake receiver. Each finger processor processes (e.g., despreads, decovers, and pilot demodulates) the assigned multipath to provide demodulated symbols for that multipath. The demodulated symbols from all assigned finger processors for a particular data transmission are then combined to provide recovered symbols for that data transmission. The operation of searcher 312 and finger processors 310 is described in further detail in U.S Pat. Nos. 5,764,687 and 5,490,165.

Searcher 312 operates in conjunction with controller 260 and a PN generator 380. As shown in FIG. 3, the $I_{IN}$ and $Q_{IN}$ samples from receiver unit 252 are provided to a buffer 358 that stores the samples for subsequent processing by searcher 312. The stored $I_{IN}$ and $Q_{IN}$ samples are thereafter provided to a PN despreader 360, which also receives a complex PN sequence, IPNs and QPNS, from PN generator 380. The complex PN sequence has a specific phase (or PN chip offset) corresponding to a particular hypothesis being searched, which may be determined by controller 260.

PN despreader 360 performs a complex multiply of the complex $I_{IN}$ and $Q_{IN}$ samples with the complex PN sequence and generates complex despread $I_{DES}$ and $Q_{DES}$ samples. This complex multiply is complementary to that performed at the base station.

For many CDMA systems, a pilot is transmitted on traffic channel zero (i.e., covered with a channelization code of zero), in which case no decovering is needed at the terminal. The despread $I_{DES}$ and $Q_{DES}$ samples are then provided to a symbol accumulator 362, which accumulates a number of despread samples corresponding to $N_C$ chips, where $N_C$ is an integer multiple of the length of the channelization code used for the pilot and other traffics. (The parameter $N_C$ may be determined by controller 260.) Symbol accumulator 362 provides the complex accumulated result, $I_{ACC}$ and $Q_{ACC}$, to a signal strength detector 364 that detects the strength of the recovered pilot. In an embodiment, signal strength detector 364 computes the energy of the pilot by (1) squaring the inphase and quadrature components of the accumulated result, $I_{ACC}^2$ and $Q_{ACC}^2$, (2) summing each pair of squared results to generate a sum of squares, $I_{ACC}^2+Q_{ACC}^2$, and (3) accumulating $N_M$ sums of squares to generate a correlated value that is indicative of the strength of the recovered pilot for this hypothesis (i.e., this PN chip offset or phase).

The design and operation of demodulator 254a for a CDMA system is described in further detail in the aforementioned U.S Pat. Nos. 5,764,687 and 5,490,165. The operation of searcher 312 to search for strong multipaths is also described in further detail below.

Figure 4A:
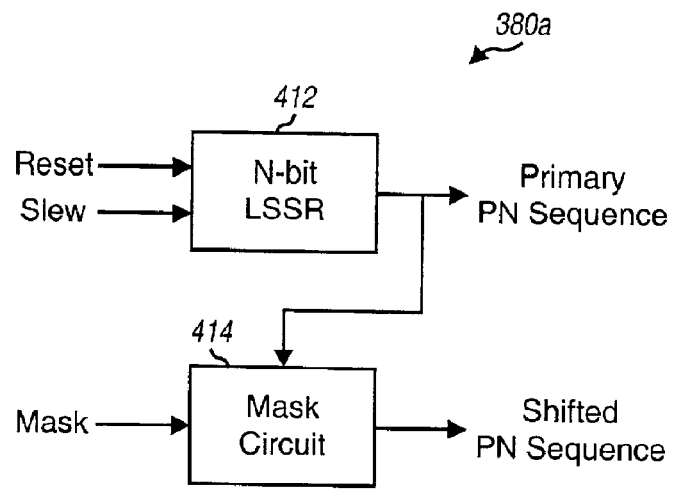
FIGS. 4A and 4B are diagrams of two PN generators capable of generating PN sequences at various phases.

FIG. 4A is a diagram of a PN generator 380a used to generate PN sequences at various phases. PN generator 380a is one embodiment of PN generator 380 in FIG. 3 and includes an N-bit linear sequence shift register (LSSR) 412 coupled to a mask circuit 414. LSSR 412 is capable of generating a PN sequence of length $2^N-1$ based on a particular polynomial, and may be implemented in a manner known in the art. A PN sequence of length $2^N$ may be generated from the PN sequence of length $2^N-1$ by using additional circuitry as described in U.S Pat. No. 5,228,054.

LSSR 412 receives a Reset control that resets the LSSR to a known state whenever activated. LSSR 412 generates a "primary" PN sequence having a length of $2^N$ and a known phase (e.g., time-aligned to system or CDMA time). Mask circuit 414 receives the primary PN sequence and an N-bit PN mask, and generates a shifted PN sequence having a phase that is shifted relative to the phase of the primary PN sequence. The amount of phase shift is determined by the value of the applied mask. Mask circuit 414 may be implemented as described in the aforementioned U.S Pat. No. 5,228,054.

PN generator 380a may be used to generate PN sequences at various phases by "masking" the primary PN sequence with various masks. The masking causes the phase of the primary PN sequence to effectively "jump" to a new phase, as determined by the value of the applied mask. As described in further detail below, since the PN sequences assigned to the base stations in some CDMA systems are offset in phase from one another by integer multiples of 64 PN chips, masks capable of generating PN sequences separated by 64 PN chips may be generated and stored (e.g., in a PN mask storage unit 382 shown in FIG. 3) for use later to generate the PN sequence with the desired phase.

To search for the pilot of a particular base station, the PN offset assigned to that base station is initially determined. The mask for that PN offset is then retrieved from PN mask storage unit 382 and applied to mask circuit 414. The shifted PN sequence generated by mask circuit 414 is then used to search for the pilot from that base station.

Since the exact phase of the pilot from the base station is not known (e.g., due to unknown propagation delay and multipath fading), the searcher typically correlates the data samples with PN sequences for a range of consecutive PN chip offsets centered around a nominal value where the pilot is suspected. This range of chip offsets defines the "code space" to be searched (i.e., the search window), and the nominal value may be obtained by applying the proper mask. PN sequences of successive one-chip offsets may thereafter be generated by the PN generator via a process often referred to as "slewing". LSSR 412 may be slewed in both the forward and reverse directions by manipulating the clock signal applied to the LSSR. For example, if the LSSR is operated at the chip rate, then the LSSR may be slewed backward one PN chip by skipping a clock pulse, and may be slewed forward one PN chip by inserting an additional clock pulse (or double clocking the LSSR once).

The techniques described herein may be used for various CDMA systems. For clarity, various aspects and embodiments of the invention are described for the IS-95 and cdma2000 systems whereby the complex PN sequence used for spreading has a length of 32,768 chips, the base stations are identified by their respective assigned PN offsets, and a continuous pilot is transmitted on the forward link from each base station to the terminals.

Figure 5A:
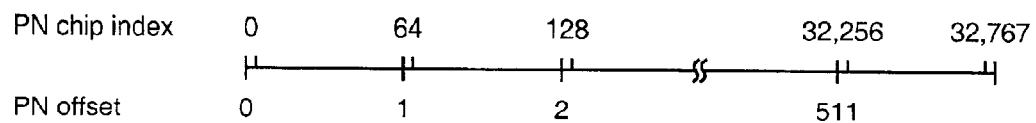
FIG. 5A is a diagram showing the indices for the PN sequence defined by IS-95 and cdma2000.

FIG. 5A is a diagram showing the indices for the PN sequence used in IS-95 and cdma2000 to generate pilots at the base stations. In IS-95 and cdma2000 systems, the pilots from neighboring base stations are differentiated from one another by spreading pilot data (typically a sequence of all zeros) at the base stations with a defined complex PN sequence (i.e., derived from a specific set of polynomials) at different PN offsets. The PN sequence is a specific data pattern of a fixed length, which is 32,768 chips for IS-95 and cdma2000 systems. The PN sequence is continually repeated to generate a continuous spreading sequence that is then used to spread the pilot and other data. The start of the PN sequence is defined by the CDMA standard and is synchronized to an absolute time reference, $T_{ABS}$. Each chip of the PN sequence is assigned a respective PN chip index, with the start of the PN sequence being assigned a PN chip index of 0 and the last chip of the PN sequence being assigned a PN chip index of 32,767.

The PN sequence may be partitioned into 512 different "PN offsets", numbered from 0 through 511, with consecutively numbered PN offsets being separated by 64 PN chips. Effectively, 512 different PN sequences may be defined based on the 512 different PN offsets, with each of the 512 PN sequences having a different starting point (i.e., a different phase) at the absolute time reference based on its PN offset. Thus, the PN sequence with a PN off set of 0 starts at PN chip index 0 at $T_{ABS}$, the PN sequence with a PN offset of 1 starts at PN chip index 64 at $T_{ABS}$, the PN sequence with a PN offset of 2 starts at PN chip index 128 at $T_{ABS}$, and so on, and the PN sequence with a PN offset of 511 starts at PN chip index 30,704 at $T_{ABS}$. There are 32,768 possible PN phases (or PN chip offsets) for the PN sequence, but only certain ones of these phases are assigned to the base stations.

The 512 possible PN sequences may then be assigned to the base stations in the CDMA system and used, among other functions, to differentiate the base stations. The closest PN offsets that may be assigned to the (neighboring) base stations are determined by the CDMA standard and the system operator. For example, the IS-95 and cdma2000 standards define a minimum value of one for PN_INC, which stands for PN chip index increment in number of 64 PN chips. Thus, a PN_INC of one denotes that the (neighboring) base stations may be assigned to PN sequences separated by a minimum PN offset of one (or 64 PN chips). A lower PN_INC value (e.g., one) results in more available PN offsets (e.g., 512) that may be assigned to the base stations. Conversely, a larger PN_INC value (e.g., four) results in fewer available PN offsets (e.g., 128) that may be assigned to the base stations.

Figure 5B:
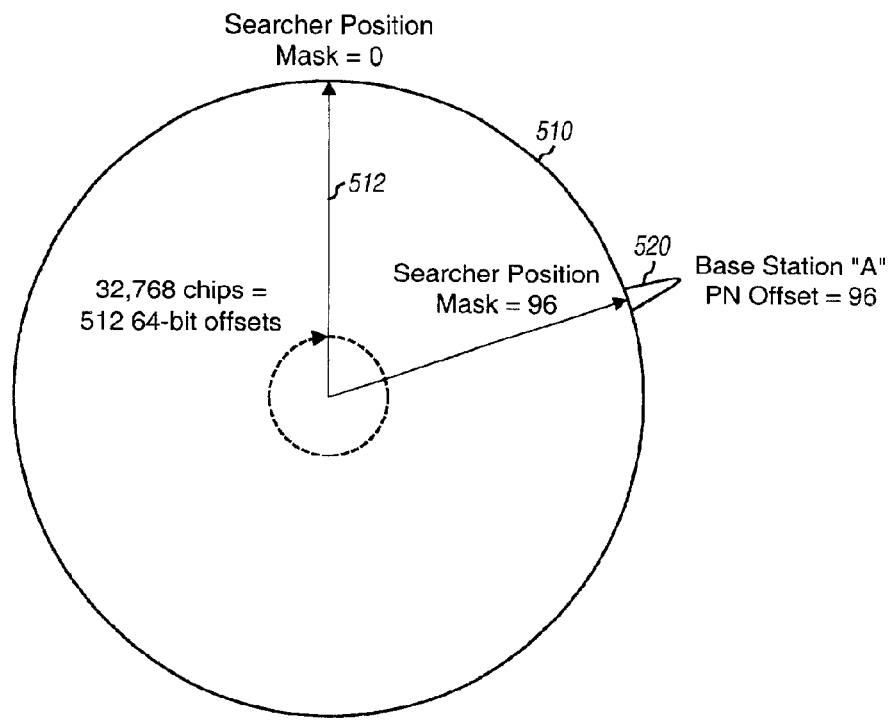
FIG. 5B is a diagram of a circle that represents the entire code space for the PN sequence.

FIG. 5B is a diagram of a circle that represents the entire code space for the PN sequence. The PN sequence with a length of 32,768 chips may be viewed as being placed on a circumference 510 of the circle, with the start of the PN sequence being aligned to the top of the circle (i.e., PN chip index of 0 is at the location pointed by a line 512). Although not shown in FIG. 5B, circumference 510 is partitioned into 32,768 evenly spaced points, with each point corresponding to a respective PN chip index.

As shown in FIG. 5B, a multipath 520 for a particular base station "A" may be received at the terminal, and this multipath is associated with a particular PN phase. To find multipath 520, a locally generated PN sequence needs to be aligned to the PN phase of the multipath being searched.

For a continuously transmitted pilot, if no knowledge is available a priori of the PN phase of the multipath, then that multipath may be found by cross-correlating the data samples with a locally generated PN sequence at each of the 32,768 possible PN phases and determining the specific PN phase that provides a high correlated result. Typically, the cross-correlation is performed for a range of PN phases at sub-chip (e.g., ½ chip) increments to provide improved performance. Due to the pseudo-random nature of the PN sequence, the cross-correlation of the data samples with the PN sequence should be low—except when the phase of the locally generated PN sequence is aligned with that of the multipath being recovered, in which case the cross-correlation results in a high correlated value. However, because of noise in the received signal, the correlated value decreases and approaches zero as the phase of the locally generated PN sequence is shifted further away from that of the multipath.

In most CDMA systems, some information is known for each of the base stations that may be in the neighborhood of the terminal. For example, a list of neighbor base stations and their assigned PN offsets may be made available to the terminal (e.g., via signaling from the base stations). In this case, instead of searching through the entire code space of 32,768 PN chips for the pilot from a particular base station, it may be necessary to search only through a smaller code space centered at the nominal PN phase for that base station. This smaller code space accounts for uncertainties due to propagation delays and multipath effects. For the example shown in FIG. 5B, the base station to be searched is assigned a PN offset of 96. In this case, a mask corresponding to 96 PN offset increments may be applied to move the primary PN sequence by 96 PN offsets (i.e., 96 64-PN chip increments) to the desired PN phase.

Figure 6A:
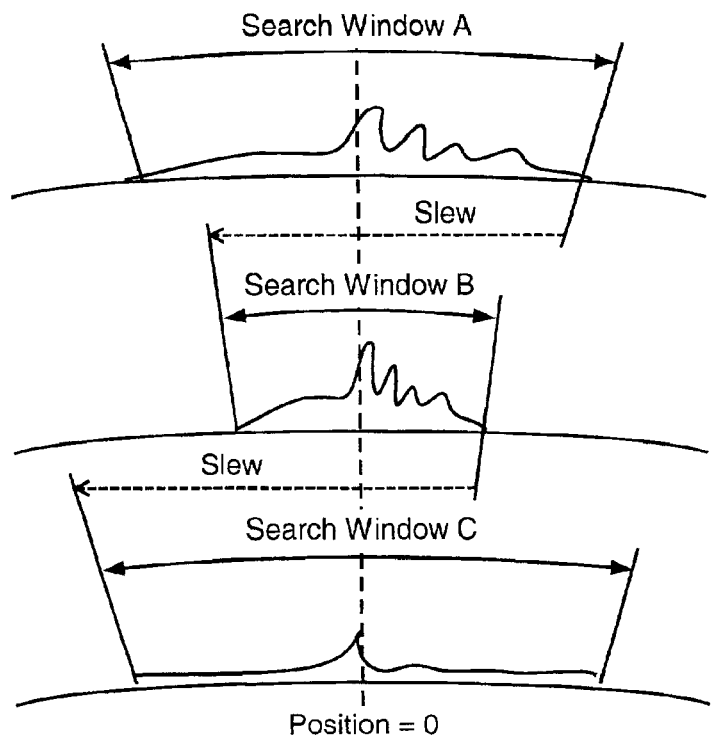
FIGS. 6A and 6B are diagrams illustrating the searches for the pilot from a particular base station.

FIG. 6A is a diagram illustrating the search for a pilot from a particular base station. To search for the pilot, the PN sequence is swept across a range of PN phases or chip offsets, and each chip offset in the search window corresponds to a hypothesis to be evaluated. This range of PN phases defines the search window. The nominal phase of the PN sequence is denoted as position=0 in FIG. 6A and may be obtained by applying the proper mask to the primary PN sequence.

In one conventional search scheme, the entire search window is scanned by first slewing the PN generator to one end (e.g., the left end) of the search window to start the scan. The PN generator is then slewed in the opposite end (e.g., toward the right end), one PN chip at a time corresponding to a new hypothesis, and a cross-correlation of the data samples with the PN sequence is then performed to evaluate the hypothesis. At the end of the first scan, the PN generator is slewed back to the start of the next search window, and another scan may thereafter be performed.

Figure 6B:
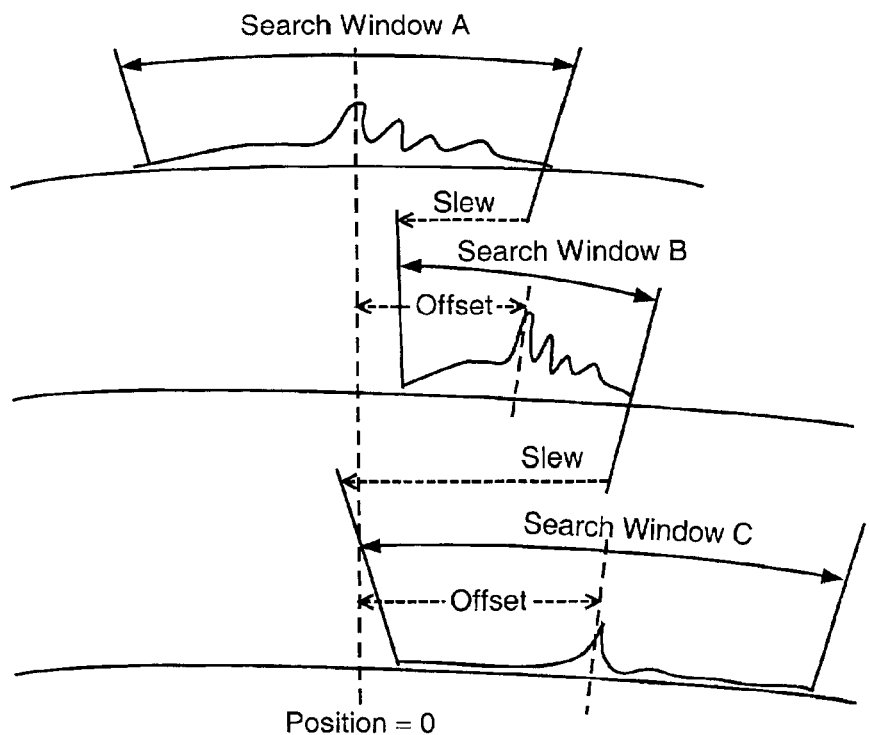

FIG. 6B is a diagram illustrating the search for the pilot from a particular base station with known offsets. In this example, the search windows for various multipaths for the base station may be centered at different chip offsets, which may be due to the different propagation delays of the multipaths. For each search window, a window offset may be specified to direct the PN generator to slew to the proper starting position.

Conventionally, one or more scans are performed to search for the pilot from a particular base station, and each scan is performed over a particular search window. Each search window may be defined to have a particular width (or size) and may be centered at a particular window offset. The window size and offset may be determined by a set of search parameter values. Conventionally, at the start of the search, a mask corresponding to the PN offset assigned to the base station is applied to the PN generator to generate a shifted PN sequence with a phase aligned to the PN offset of the base station to be searched. The mask is typically used for the entire duration in which this base station is searched. Any phase adjustment to the shifted PN sequence is typically performed by slewing the PN sequence either backward or forward for the desired number of PN chips.

At the end of each scan, if another sweep for another search window is to be performed, the PN generator is slewed back to the start of the next search window to conduct a subsequent scan for the pilot of the same multipath or a different multipath from the same or different base station. Depending on the center locations and sizes of the search windows, a relatively long slew may be performed between successive scans to move the PN sequence to the start of the next search window. This slewing process is typically time consuming. For example, if a slew can be achieved at a rate of one PN chip per one chip in time (i.e., 1 chip/chip), then a slew of 64 PN chips would require 64 chips in time. And if the chip rate is 1.288 Mcps, then a slew of 64 PN chips would require approximately 52 $\mu$sec (i.e., 64 chips·0.814 $\mu$sec/chip≅52 $\mu$sec). This relatively long slew time may impact search performance.

In accordance with an aspect of the invention, the PN generator is move to the desired phase (e.g., at the start of each scan) by applying a mask (if necessary) to obtain a large phase adjustment, which reduces (or minimizes) the required amount of slewing. Slewing may then be performed (if and to the extent necessary) to obtain the desired phase. Prior to the first scan for a particular base station, a mask corresponding to a location (or phase) closest to the start of the search window may be applied to the PN generator to obtain an initial phase for the PN sequence. This location may be determined by a combination of (1) the PN offset assigned to the base station, (2) the offset of the search window, which may be determined by the known propagation delay of the multipath being searched, and (3) the size of the search window. From the initial location obtained by the applied mask, the PN generator is then slewed to the start of the search window. The scan over the search window can thereafter commence. Using the techniques described herein, masking is used to perform "coarse" phase adjustment and slewing is used to achieve "fine" phase adjustment. Masking can be used to account for larger phase adjustment that would otherwise take more time to accomplish via slewing.

In an embodiment, since the PN offsets assigned to the base stations are separated by integer multiples of 64 PN chips, masks that can shift the PN sequence in increments of 64 PN chips may be generated and stored for later use. Each mask has a width of 15 bits, and 512 masks are stored for each of the inphase (I) and quadrature (Q) PN sequences that comprise the complex PN sequence used for despreading. In this case, the largest amount to be slewed is 32 PN chips (or half of the 64-PN chip increment of the masks).

In another embodiment, masks that can shift the PN sequence in increments of less than 64 PN chips may also be generated and stored. For example, masks that can shift the PN sequence in increments of 32 PN chips, 16 PN chips, 8 PN chips, and so on, may be used. Each time the increment size is reduced by a factor of two (e.g., from 64 down to 32 PN chips), twice as many masks are needed and the storage requirement approximately doubles. However, each time the increment size is reduced by a factor of two, the largest amount to be slewed is also reduced by a factor of two. Thus, a tradeoff may be made between storage requirement and faster time to the desired start location by slewing fewer PN chips. In general, any increment may be used for the mask and this is within the scope of the invention.

The possible improvement in performance using the PN phase adjustment techniques described herein may be shown by way of an example. In this example, the PN sequence has a length of 32,768 chips and consecutive PN offsets are separated by 64 PN chips (i.e., PN offset increment=64 chips). In the conventional search scheme, the mask corresponding to the PN offset of the base station to be searched is applied, and the PN generator is also slewed S chips to the start of the search window.

In a new search scheme that implements the techniques described herein, the amount to be slewed (S) is initially partitioned into a "coarse" phase adjustment and a "fine" phase adjustment. The coarse phase adjustment (e.g., S/64) is representative of the number of PN offset increments to be slewed, and the fine phase adjustment (e.g., S modulo 64) is representative of the fractional part of the PN offset increment to be slewed. With the new search scheme, instead of applying the mask for the assigned PN offset, M[P], the mask for the assigned PN offset plus the coarse phase adjustment, M[(P+S/64) modulo 512], is applied.

The conventional and new search schemes are summarized as follows:

Conventional Search Scheme
  Slew=S (chips)
  PN offset=P (64-chip offsets)
  Searcher Mask=M[P]
  Original reported search position=RSP (raw search position)
  New reported search position (after slew)=RSP'=(RSP+S) modulo 32,768

New Search Scheme
  Slew=S (chips)
  PN offset=P (64-chip offsets)
  Searcher Mask=M[(P+S/64) modulo 512]
  Original reported search position=RSP (raw search position)
  New reported search position (after slew)=RSP'= {RSP+(S modulo 64)} modulo 32,768

In the above example, the fine phase adjustment may be obtained by taking the eight least significant bits (LSBs) of the slew, S, and the coarse phase adjustment may be obtained by taking the remaining most significant bits (MSBs) of the slew. This effectively performs a truncation of the S/64 operation, in which case the coarse phase adjustment may be expressed as $\lfloor S/64 \rfloor$.

Further improvement may be obtained by rounding the result of the S/64 operation. This rounding may be achieved by examining the result of the (S modulo 64) operation, and rounding up if the result is 32 or greater and rounding down if the result is 31 or less. To round up, the coarse value $\lfloor S/64 \rfloor$ obtained from the MSBs is incremented by one, and the fine value is determined as (64-(S modulo 64)). And to round down, the coarse value $\lfloor S/64 \rfloor$ is simply provided, and the fine value is determined as (S modulo 64). This rounding scheme assumes that the slew speed for the forward direction is the same as the slew speed for the reverse direction. Rounding reduces the amount of phase adjustment to be slewed.

The rounding may also be performed to account for different slew speeds for the forward and reverse directions. For example, if the slew speed for the forward direction is seven times the slew speed for the reverse direction, then the rounding threshold may be selected to provide a slewing range of −56 to +8 chips (instead of a range of −32 to 32 chips for equal forward and reverse slew speeds).

From the above example, it can be seen that as the amount of slew, S, increases, the improvement in search performance using the new search scheme also increases. Moreover, using rounding, the amount to be slewed may be limited to less than 32 PN chips, or half of the 64-PN chip increment of the masks. This may be much less than for the conventional search scheme whereby the amount to be slewed may be 100 PN chips or possibly more.

The techniques described herein may be advantageously used for moving the PN generator to the start of each search window to be scanned. As shown in FIGS. 6A and 6B, a large amount of slew may be needed after each completed scan to move the PN generator to the start of the next search window. Using masks to account for large amount of phase adjustment, the PN generator can be moved more quickly to the start of the next search window and the next scan can commence earlier. The time needed to perform offset searching (as shown by search window B in FIG. 6B) may also be reduced by using masks to jump the PN generator to the start of the offset search window, rather than slewing to the new location.

Figure 4B:
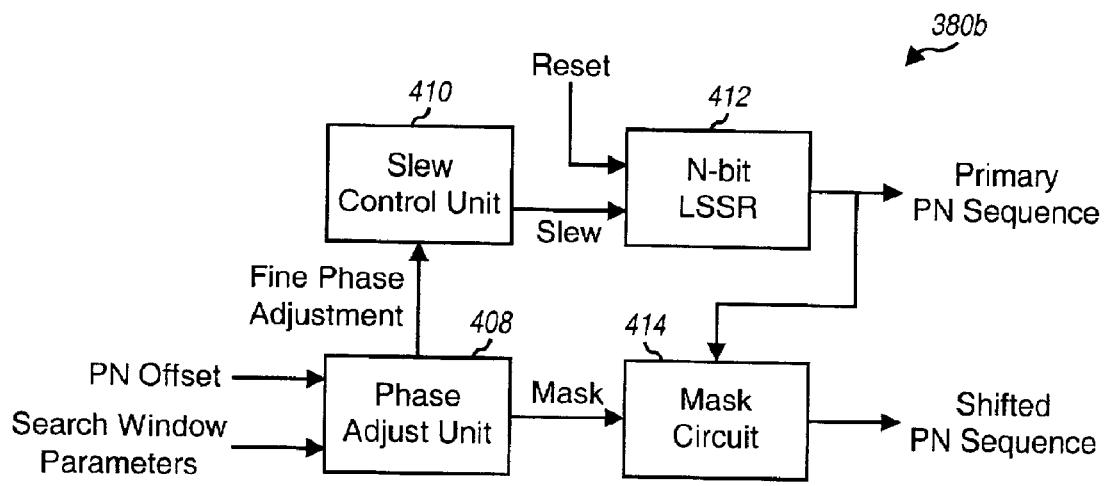

FIG. 4B is a diagram of a PN generator 380b used to generate PN sequences at various phases, in accordance with an embodiment of the invention. PN generator 380b may be used for PN generator 380 in FIG. 3 and includes a phase adjust unit 408, a slew control unit 410, N-bit LSSR 412, and mask circuit 414. LSSR 412 and mask circuit 414 may be implemented as described in the aforementioned U.S Pat. No. 5,228,054.

Phase adjust unit 408 receives the PN offset of the base station to be searched and various parameter values for a new search window to be scanned. These parameters may include the window offset, the window width, and possibly others. Based on the PN offset, the search window parameter values, and the current searcher position (i.e., the current phase of the PN sequence), phase adjust unit 408 initially determines phase adjustment to move the PN sequence from the current phase to the new phase. Phase adjust unit 408 then partitions the phase adjustment into the coarse and fine phase adjustments, as described above, with the fine phase adjustment being provided to slew control unit 410. Phase adjust unit 408 also combines the coarse phase adjustment with the PN offset and provides a mask corresponding to the combined value to mask circuit 414. Slew control unit 410 generates and provides the proper Slew control to LSSR 412 based on the fine phase adjustment received from phase adjust unit 408.

Referring back to FIG. 4A, the actual phase of the shifted PN sequence generated by the PN generator may be determined based in part on the value of the applied mask. Normal slews that would cause the PN sequence to shift in phase may be accomplished instead by masking, which leaves the absolute position of the primary PN sequence unchanged. Therefore, to recall the actual phase of the shifted PN sequence, which may be needed for a finger processor assigned to process a found multipath, the applied mask as well as the amount of slew are both considered since they reflect on the phase of the PN sequence where the multipath is found.

Figure 7:
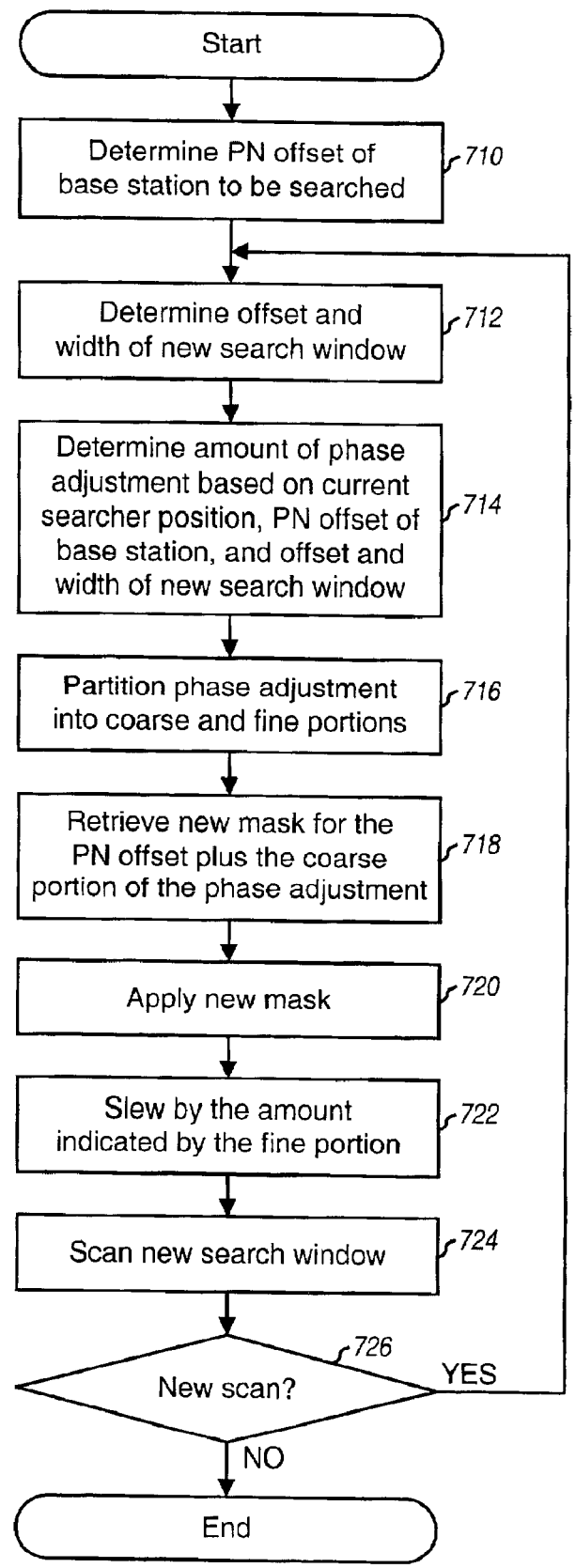
FIG. 7 is a flow diagram of a process to search for a pilot, in accordance with an embodiment of the invention.

FIG. 7 is a flow diagram of a process to search for a pilot, in accordance with an embodiment of the invention. Initially, the PN offset of the base station to be searched is determined, at step 710. The offset (if any) and the width of a new search window for an upcoming scan is then determined, at step 712. Based on the current searcher position, the PN offset of the base station, and the offset and width of the new search window, the amount of phase adjustment required to move the PN generator to the start of the search window from the current searcher position is determined, at step 714.

The required phase adjustment is next partitioned into a coarse portion and a fine portion, at step 716, which may be achieved as described above. The coarse portion is combined with the PN offset for the base station, and a mask for this combined value is retrieved, at step 718, and then applied, at step 720. The PN generator is also slewed by the amount indicated by the fine portion, at step 722. The combination of the mask and slew moves the PN generator to the start of the new search window. A scan of the new search window is subsequently performed, at step 724.

Upon completion of the scan, a determination is made whether or not a new scan needs to be performed, at step 726. If a new scan is to be performed, the process returns to step 712 and the PN generator is adjusted to the start of the new search window. Otherwise, if another scan is not needed, the process terminates.

The PN generator and the demodulator (e.g., rake receiver) that uses the PN generator may be implemented within one or more digital signal processors (DSP), application specific integrated circuits (ASIC), processors, microprocessors, controllers, microcontrollers, field programmable gate arrays (FPGA), programmable logic devices, other electronic units, or any combination thereof. The PN generator and demodulator may also be implemented with software executed on a processor (e.g., controller 260 in FIGS. 2 and 3) or a combination of software and hardware. For example, referring to FIG. 4B, LSSR 412 and mask circuit 414 may be implemented in hardware and phase adjust unit 408 and slew control unit 410 may be implemented based on program codes executed on a processor.

For clarity, various aspects and embodiments of the invention have been described for a CDMA system that implements the IS-95 or cdma2000 standard. The techniques described herein may also be applied to other wireless communication systems that use a PN sequence for spreading. Examples of such systems include CDMA systems that conform to the W-CDMA standard.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for generating a pseudo-random number (PN) sequence used to search for a transmitted signal in a wireless communication system, comprising:

determining a PN offset associated with a transmission source of the transmitted signal to be searched;

determining current phase of the PN sequence;

determining new phase for the PN sequence for a new search for the transmitted signal, the new PN phase being dependent on the PN offset associated with the transmission source;

determining difference between the new and current PN phases;

selecting a PN mask based at least in part on the determined phase difference, wherein the PN mask is used to adjust the phase of the PN sequence by a particular amount determined by a value of the PN mask; and generating the PN sequence with the new phase based at least in part on the selected PN mask.

2. The method of claim 1, further comprising:

partitioning the determined phase difference into a coarse phase adjustment and a fine phase adjustment, and wherein the PN mask is selected based at least in part on the coarse phase adjustment.

3. The method of claim 2, wherein the coarse phase adjustment is in increments of 64 PN chips.

4. The method of claim 2, further comprising:

adjusting the phase of the PN sequence by the fine phase adjustment.

5. The method of claim 4, wherein the adjusting is achieved by slewing the PN sequence one PN chip at a time.

6. The method of claim 1, further comprising:

defining a search window to be used for the new search, wherein the search window comprises a range of PN phases to be searched, and wherein the new PN phase is dependent on values for one or more parameters defining the search window.

7. The method of claim 6, wherein the new PN phase is dependent on a width of the search window.

8. The method of claim 6, wherein the new PN phase is dependent on an offset for the search window.

9. The method of claim 1, further comprising:

generating a primary PN sequence with a PN generator having a linear sequential shift register (LSSR), and wherein the PN sequence with the new phase is generated by applying the selected PN mask to the primary PN sequence.

10. The method of claim 1, wherein the PN mask is selected from a plurality of possible PN masks.

11. The method of claim 10, wherein the plurality of possible PN masks are capable of providing PN sequences separated from each other by at most 64 PN chips.

12. The method of claim 1, wherein the communication system is a CDMA system.

13. The method of claim 12, wherein the CDMA system implements IS-95 or cdma2000 standard.

14. A method of generating a pseudo-random number (PN) sequence used to search for a transmitted signal in a wireless communication system, comprising:

determining a current phase of the PN sequence;

determining a new phase for the PN sequence for a new search for the transmitted signal;

determining a difference between the new and current PN phases;

selecting a PN mask, from a plurality of possible PN masks, based at least in part on the determined phase difference and to minimize a distance between the new PN phase and the PN phase obtained with the selected PN mask; and generating the PN sequence with the new phase based at least in part on the selected PN mask.

15. A method for searching for a pilot in a wireless communication system, comprising:

identifying a transmission source for the pilot to be searched;

determining a PN offset associated with the transmission source;

defining a search window to be used for a new search for the pilot, wherein the search window comprises a range of PN phases to be searched;

determining a phase adjustment for a pseudo-random number (PN) sequence to move the PN sequence from a current PN phase to a new PN phase, wherein the new PN phase is dependent on the PN offset associated with the transmission source and one or more parameter values for the search window;

selecting a PN mask based at least in part on the determined phase adjustment, wherein the PN mask is used to adjust the phase of the PN sequence by a particular amount determined by a value of the PN mask;

generating the PN sequence with the new phase based at least in part on the selected PN mask; and processing a received signal with the generated PN sequence to search for the pilot.

16. The method of claim 15, wherein the search for the pilot is performed for a plurality of search windows and wherein a PN mask is selected for each search window.

17. The method of claim 15, further comprising:

partitioning the determined phase adjustment into a coarse phase adjustment and a fine phase adjustment, wherein the PN mask is selected based at least in part on the coarse phase adjustment.

18. The method of claim 17, further comprising:

adjusting the phase of the PN sequence one or more PN chips at a time to move the phase of the PN sequence by the fine phase adjustment.

19. A receiver unit in a wireless communication system, comprising:

a controller operative to determine a pseudo-random number (PN) offset associated with a transmission source, to determine a current phase of a PN sequence used to search for a pilot from the transmission source, to determine a new phase for the PN sequence for a new search for the pilot, and to determine a difference between the new and current PN phases, the new PN phase being dependent on the PN offset associated with the transmission source; and a PN generator operative to receive a PN mask selected based at least in part on the determined base difference, wherein the PN mask is used to adjust the phase of the PN sequence by a particular amount determined by a value of the PN mask, and to generate the PN sequence with the new phase based at least in part on the PN mask.

20. The receiver unit of claim 19, further comprising:

a searcher element coupled to the PN generator and operative to receive and correlate data samples for a received signal with the generated PN sequence to provide a correlated value used to detect the pilot.

21. The receiver unit of claim 20, wherein the controller is further operative to direct the PN generator and the searcher element to search for the pilot within a particular search window representative of a range of PN phases.

22. The receiver unit of claim 21, wherein the controller is further operative to select the PN mask from a plurality of possible PN masks, and wherein the plurality of possible PN masks are capable of providing PN sequences separated from each other by at most 64 PN chips.

23. The receiver unit of claim 19, wherein the controller is further operative to partition the phase difference into a coarse phase adjustment and a fine phase adjustment and to select the PN mask based at least in part on to coarse phase adjustment.

24. The receiver unit of claim 23, wherein the PN generator is further operative to adjust the phase of the PN sequence by the fine phase adjustment.

25. An apparatus in a wireless communication system, comprising:

means for determining a pseudo-random number (PN) offset associated with a transmission source;

means for determining a current phase of a PN sequence;

means for determining a new phase for the PN sequence for a new search for a pilot from the transmission source, the new PN phase being dependent on the PN offset associated with the transmission source;

means for determining a difference between the new PN phase and the current PN phase;

means for selecting a PN mask based at least in part on the phase difference; and means for generating the PN sequence with the new phase based at least in part on the PN mask.

26. The apparatus of claim 25, further comprising:

means for partitioning the phase difference into a coarse phase adjustment and a fine phase adjustment, and wherein the PN mask is selected further based on the coarse phase adjustment.

27. The apparatus of claim 26, further comprising:

means for adjusting the phase of the PN sequence by the fine phase adjustment.

28. The apparatus of claim 25, further comprising:

means for defining a search window to be used for the new search, wherein the new PN phase is dependent on values for one or more parameters defining the search window.

* * * * *